(12) United States Patent
Takeda et al.

(10) Patent No.: US 8,799,636 B2
(45) Date of Patent: Aug. 5, 2014

(54) ELECTRONIC APPARATUS AND METHOD FOR CHANGING AN ATTACHMENT STATE OF A BATTERY PACK

(75) Inventors: Yoshiro Takeda, Yokohama (JP); Toshihiro Miyamoto, Machida (JP)

(73) Assignee: Fujitsu Limited, Kawasaki (JP)

( * ) Notice: Subject to any disclaimer, the term of this patent is extended or adjusted under 35 U.S.C. 154(b) by 260 days.

(21) Appl. No.: 13/535,089

(22) Filed: Jun. 27, 2012

(65) Prior Publication Data

US 2013/0042099 A1 Feb. 14, 2013

(30) Foreign Application Priority Data

Aug. 8, 2011 (JP) .................................. 2011-172976

(51) Int. Cl.
*H01M 6/36* (2006.01)
*H01M 2/30* (2006.01)

(52) U.S. Cl.
USPC .............................. 713/100; 429/61; 429/112

(58) Field of Classification Search
USPC ..................... 713/100; 429/61, 112
See application file for complete search history.

(56) References Cited

U.S. PATENT DOCUMENTS

| | | | |
|---|---|---|---|
| 2006/0121956 A1* | 6/2006 | Lee .............................. | 455/574 |
| 2010/0143771 A1* | 6/2010 | Jeong et al. .................... | 429/62 |
| 2010/0207574 A1* | 8/2010 | Ortiz-Nieves ................ | 320/103 |
| 2011/0001456 A1* | 1/2011 | Wang ........................... | 320/117 |

FOREIGN PATENT DOCUMENTS

JP 2010-140857 A 6/2010

* cited by examiner

*Primary Examiner* — Vincent Tran
(74) *Attorney, Agent, or Firm* — Maschoff Brennan

(57) ABSTRACT

An electronic apparatus includes a processor and a memory coupled to the processor. The processor executes a process including calculating a first accumulated time during which the battery device feeds power to the electronic apparatus while being attached to the electronic apparatus in a first attachment state in which a first surface of the battery device faces a reference surface provided in the electronic apparatus, calculating a second accumulated time during which the battery device feeds power to the electronic apparatus while being attached to the electronic apparatus in a second attachment state in which a second surface of the battery device faces the reference surface, the second surface being different from the first surface, and providing an instruction to change an attachment state of the battery device when a difference between the first accumulated time and the second accumulated time exceeds a given time.

6 Claims, 18 Drawing Sheets

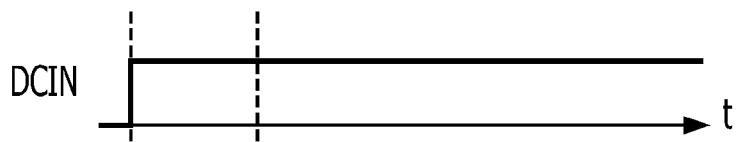
FIG. 18A  DCIN
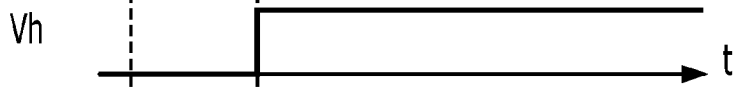
FIG. 18B  Vh
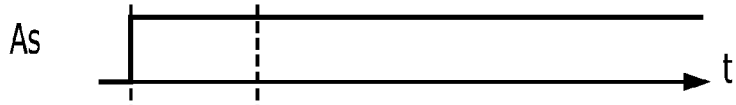
FIG. 18C  As
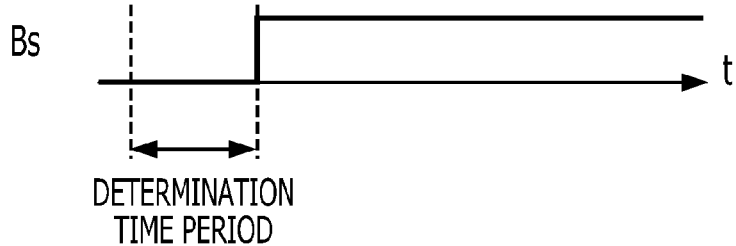
FIG. 18D  Bs
DETERMINATION
TIME PERIOD

ELECTRONIC APPARATUS AND METHOD FOR CHANGING AN ATTACHMENT STATE OF A BATTERY PACK

CROSS-REFERENCE TO RELATED APPLICATION

This application is based upon and claims the benefit of priority of the prior Japanese Patent Application No. 2011-172976, filed on Aug. 8, 2011, the entire contents of which are incorporated herein by reference.

FIELD

The embodiment discussed herein is related to an electronic apparatus in which a battery is to be attached.

BACKGROUND

Traditionally, electronic apparatuses (devices) such as personal computers, digital cameras and mobile terminals are each configured so that a battery pack (battery device) that stores a plurality of rechargeable battery cells (for example, lithium ion secondary battery cells) in a single container may be attached to the electronic device.

Various techniques have been developed for battery packs. For example, the following technique is known. In order to enable a battery pack with a simple configuration to be replaced when a battery runs out, a primary battery and a secondary battery are provided in the battery pack, and a connection terminal of the primary battery and a connection terminal of the secondary battery are point-symmetrically located.

Japanese Laid-open Patent Publication No. 2010-140857 is an example of related art.

The life of a battery pack is largely affected by thermal stress. However, when the battery pack is fixedly installed in a given location of an electronic device, the distance between a heat source (for example, a central processing unit (CPU)) included in the electronic device and each cell arranged in the battery pack is different for each cell. Thus, the life of the whole battery pack is determined based on a single cell that is closest to the heat source (that is, subjected to the highest thermal stress), and the life of the battery pack is shorter than a battery pack in which the amounts of heat received by cells are equal. A short life of the battery pack increases the running cost of the electronic device. In addition, because lithium, which is a raw material for lithium ion batteries that are frequently used as cells, is rare, there is a concern about the depletion of lithium in the future. From the perspective of protection of the Earth's resources, it is not desirable to reduce the life of a battery in which lithium is used. In order to equalize the amount of heat received by the cells, one method considered is to pack the battery pack with a high thermal conducting material. However, this causes an increase in cost and is not preferable.

SUMMARY

According to an aspect of the invention, an electronic apparatus includes a processor and a memory coupled to the processor. The processor executes a process including calculating a first accumulated time during which the battery device feeds power to the electronic apparatus while being attached to the electronic apparatus in a first attachment state in which a first surface of the battery device faces a reference surface provided in the electronic apparatus, calculating a second accumulated time during which the battery device feeds power to the electronic apparatus while being attached to the electronic apparatus in a second attachment state in which a second surface of the battery device faces the reference surface, the second surface being different from the first surface, and providing an instruction to change an attachment state of the battery device when a difference between the first accumulated time and the second accumulated time exceeds a given time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 18A-18D are timing charts of operations of the modified example of the power supply circuit of the PC, according to the embodiment.

DESCRIPTION OF EMBODIMENT

(1) System According to Embodiment

Figure 1:
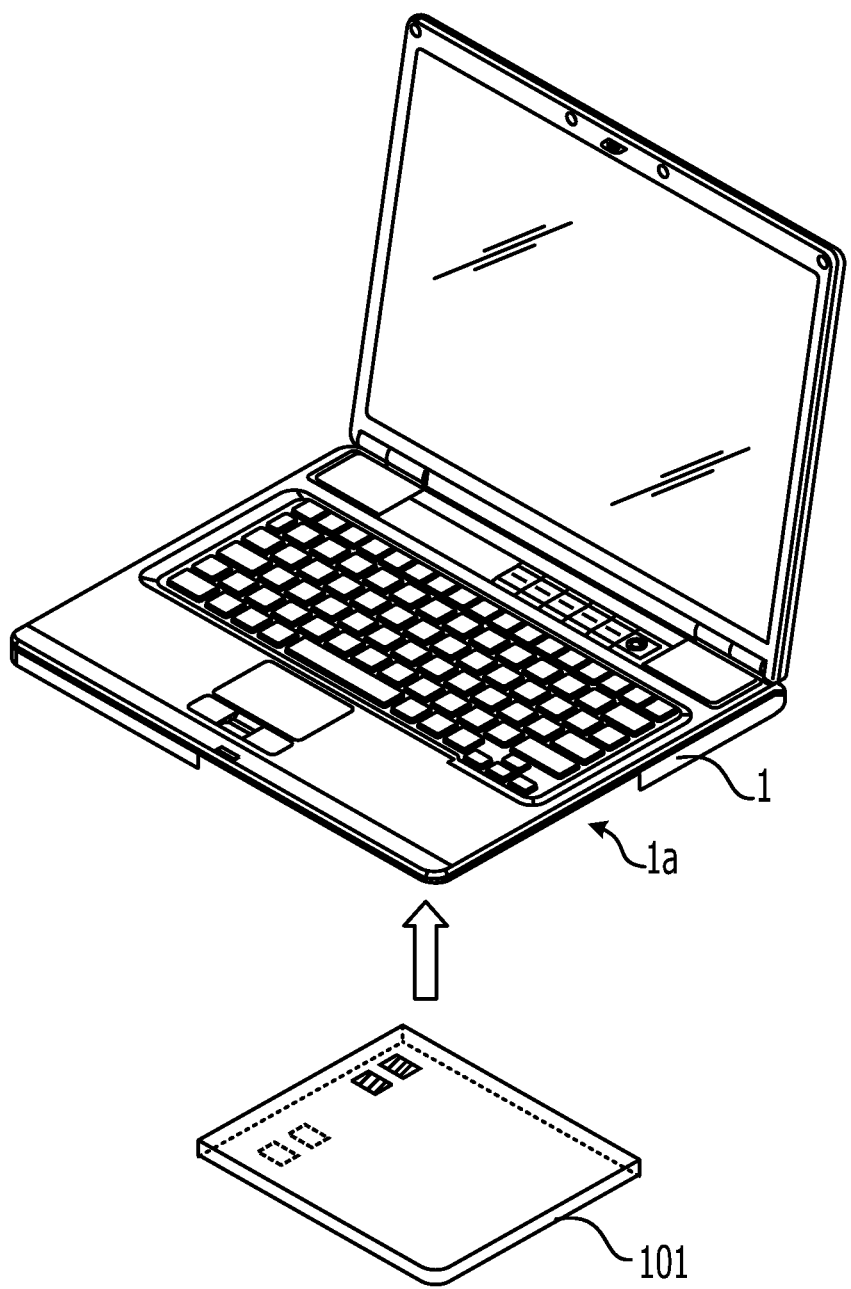
FIG. 1 is a diagram illustrating an example of a system according to an embodiment.

FIG. 1 illustrates a system according to an embodiment. The system according to the embodiment includes a laptop personal computer (hereinafter "PC") 1 and a battery pack 101, for example. The battery pack 101 feeds power to the PC1 when the battery pack 101 is attached to the PC1. The PC1 is an example of an electronic device. The battery pack 101 is an example of a battery device. In an example illustrated in FIG. 1, the battery pack 101 is attached to a given part 1a that is included in the chassis of the PC1 and located on a side of the bottom surface of the PC1. The battery pack 101 according to the embodiment includes a housing that houses therein a plurality of cells. The battery pack 101 may be attached to the PC1 in at least two attachment states where the battery pack 101 may feed power to the PC1.

In the system according to the embodiment, the PC1 detects two different states of attachment (a first attachment state and a second attachment state) of the battery pack 101 with respect to the PC1. When the difference between an accumulated time during which the battery pack 101 is in the first attachment state and an accumulated time during which the battery pack 101 is in the second attachment state exceeds a given time, the PC1 instructs a user, in a fashion that may be perceptually recognizable, to change the attachment state of the battery pack 101. As a result of the user appropriately changing the attachment state, the accumulated time during which the battery pack 101 is in the first attachment state and the accumulated time during which the battery pack 101 is in the second attachment state may become nearly equal to each other. The position of a heat source, such as a CPU, is fixed in the PC1. Thus, when the state of attachment of the battery pack 101 to the PC1 is changed, the position of the cells included in the battery pack 101 change relative to the heat source. When the accumulated time during which the battery pack 101 is in the first attachment state and the accumulated time during which the battery pack 101 is in the second attachment state become nearly equal to each other, the amounts of heat received by the cells from the heat source may be equalized. Thus, early degradation of a specific cell included in the battery pack may be suppressed due to the equalization of the amount of received heat. A reduction in the life of the battery pack 101, therefore, may be suppressed.

(2) Configuration of Battery Pack

Several examples of the battery pack 101 that may be attached to the PC1 in two states that may feed power to the PC1 are described below.

Figure 2:
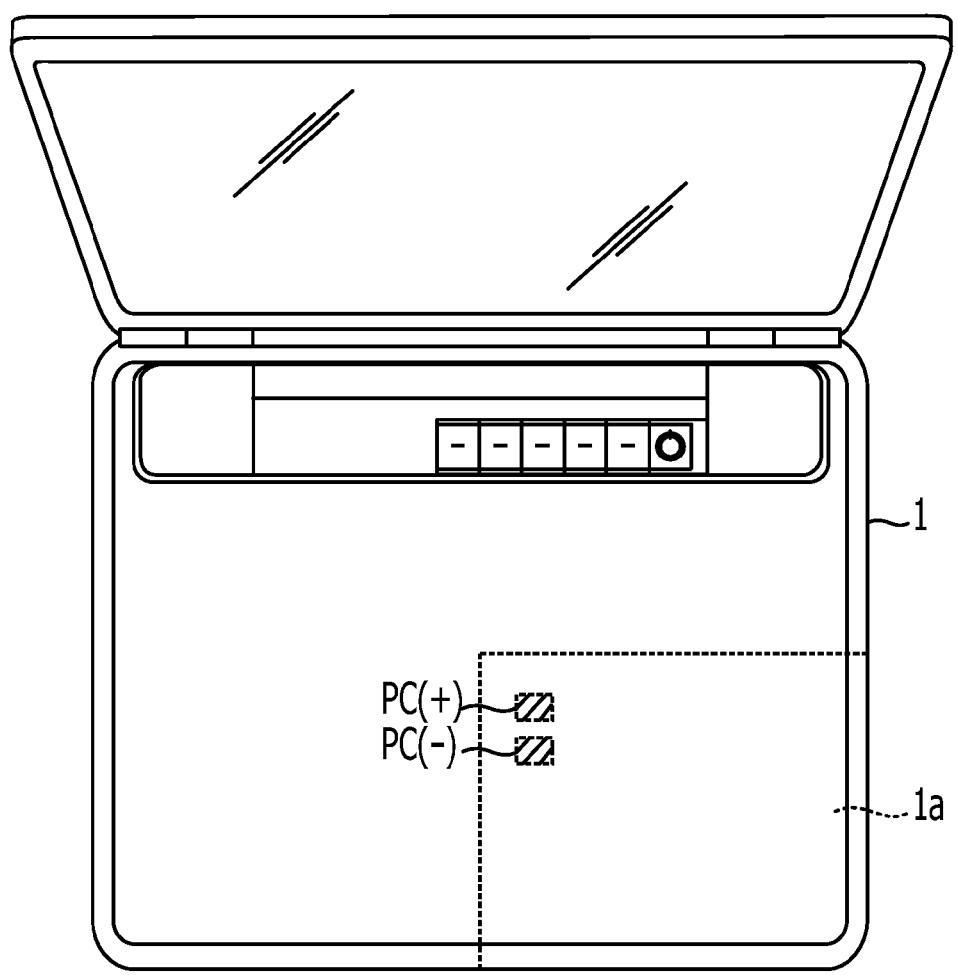
FIG. 2 is a plan view of an example of a PC according to the embodiment.
Figure 3A:
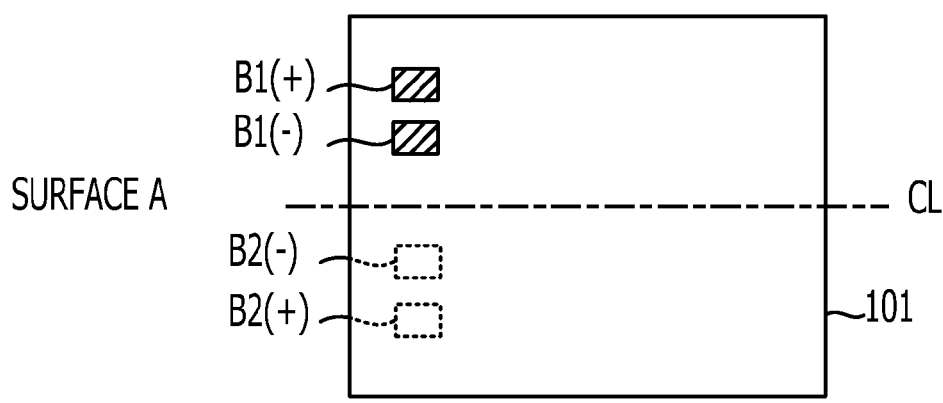
FIGS. 3A and 3B are plan views of an example of a battery pack according to the embodiment.
Figure 3B:
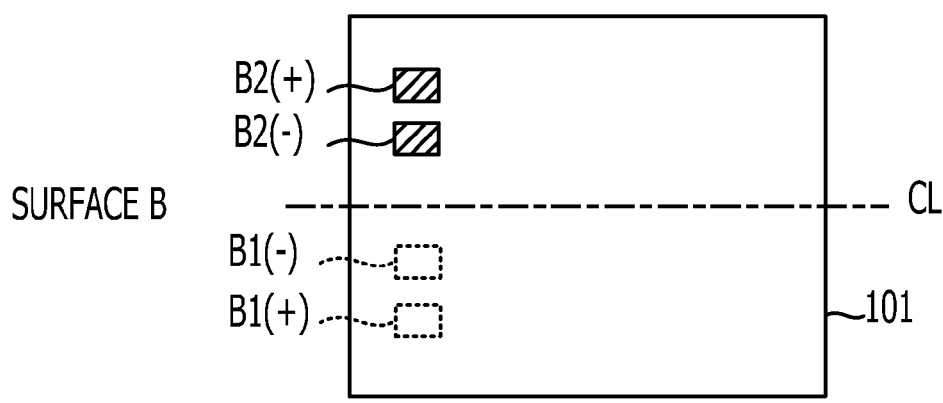

In the example illustrated in FIGS. 1 to 3B, the battery pack 101 may be attached to the PC1 and feed power to the PC1 even when the top and bottom surfaces of the battery pack 101 are turned upside down. In this example, the PC1 has a positive terminal PC(+) and a negative terminal PC(−) on the bottom surface of the PC1, as illustrated in FIG. 2. As illustrated in FIGS. 3A and 3B, the two surfaces (of the battery pack 101) that may face the bottom surface of the PC1 when the battery pack 101 is attached to the PC1 are called surface A and surface B. The battery pack 101 has a positive terminal B1(+) and a negative terminal B1(−) on surface A. The battery pack 101 has a positive terminal B2(+) and a negative terminal B2(−) on surface B. The positive terminal B1(+) and the negative terminal B1(−) are located rotationally symmetric about a central axis CL of the battery pack 101 with respect to the positive terminal B2(+) and the negative terminal B2(−). Thus, when the battery pack 101 is attached to the PC1 with either surface A or B facing upward, the battery back 101 may feed power to the PC1. Surface A is an example of a first surface and surface B is an example of a second surface.

Figure 4:
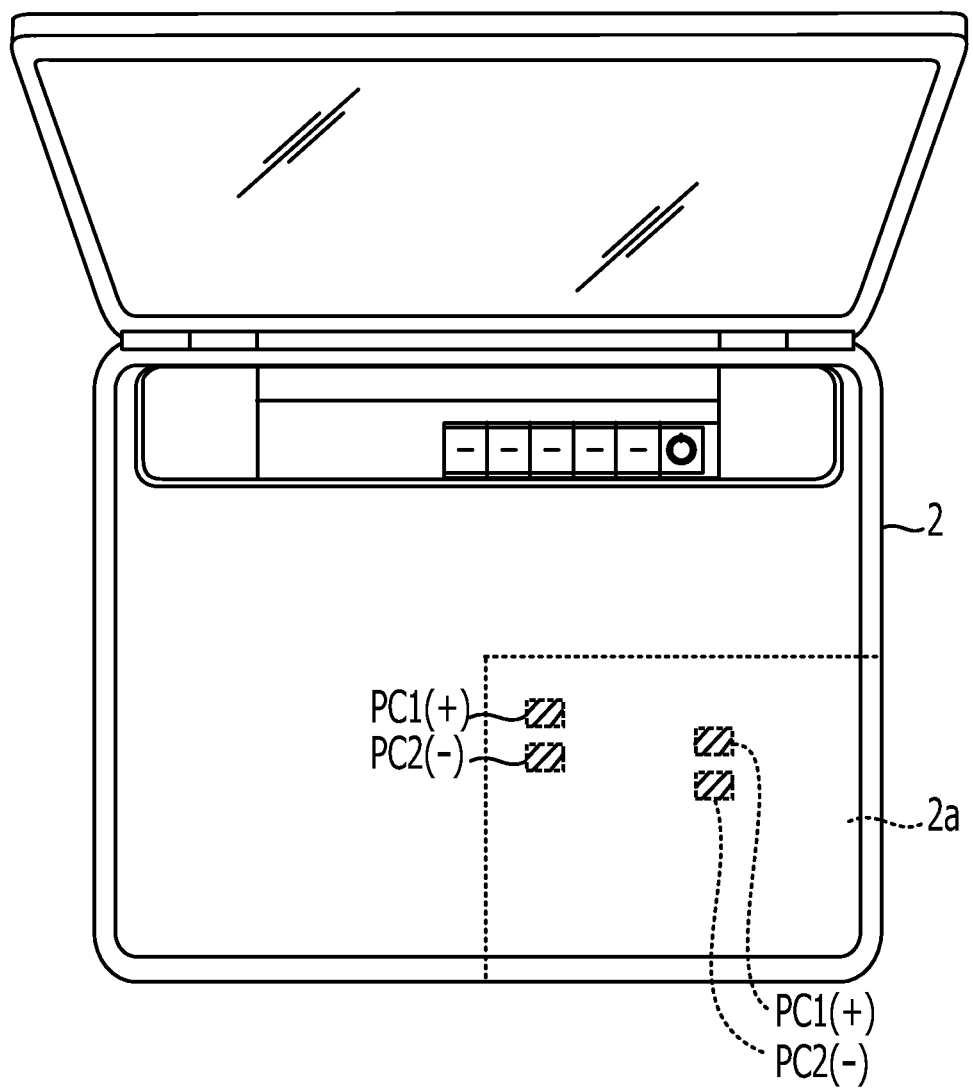
FIG. 4 is a plan view of an example of the PC according to the embodiment.
Figure 5A:
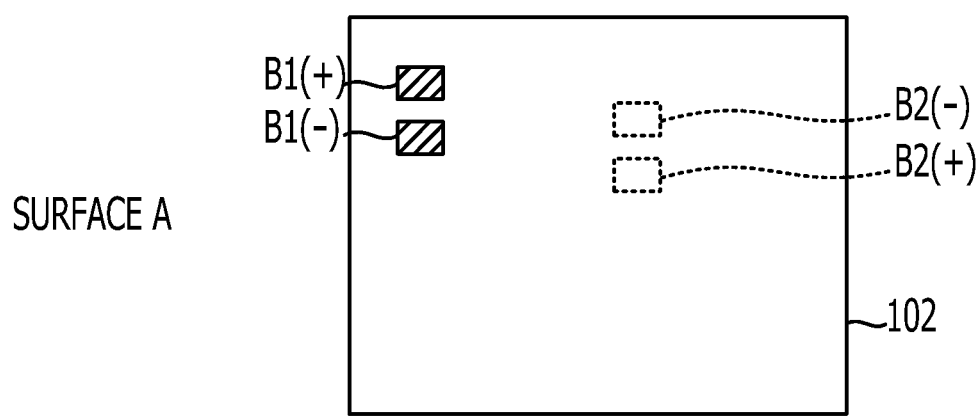
FIGS. 5A and 5B are plan views of an example of the battery pack according to the embodiment.
Figure 5B:
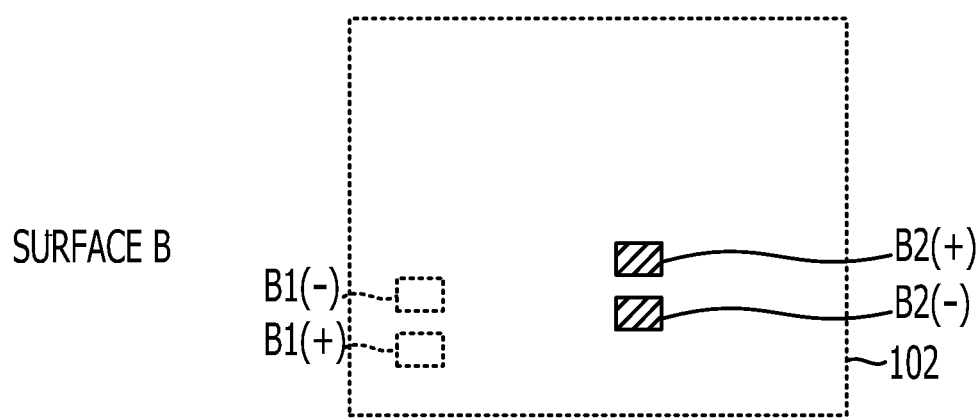

In an example illustrated in FIGS. 4, 5A, and 5B, a battery pack 102 may be attached to a given part 2a of a PC2 and feed power to the PC2 even when the top and bottom surfaces of the battery pack 102 are turned upside down. In this example, the PC2 has positive terminals PC1(+) and PC2(+) and negative terminals PC1(−) and PC2(−) on a bottom surface of the PC2 as illustrated in FIG. 4. As illustrated in FIGS. 5A and 5B, two surfaces of the battery pack 102 that may face the bottom surface of the PC2 when the battery pack 102 is attached to the PC2 are called surface A and surface B. The battery pack 102 has a positive terminal B1(+) and a negative terminal B1(−) on surface A, located at positions corresponding to the positive terminal PC1(+) and negative terminal PC1(−) of the PC2, respectively. The battery pack 102 has a positive terminal B2(+) and a negative terminal B2(−) on the surface B, located at positions corresponding to the positive terminal PC2(+) and negative terminal PC2(−) of the PC2, respectively. Thus, when the battery pack 102 is attached to the PC2 and either surface A or surface B faces upward, the battery back 102 may feed power to the PC2.

Figure 6:
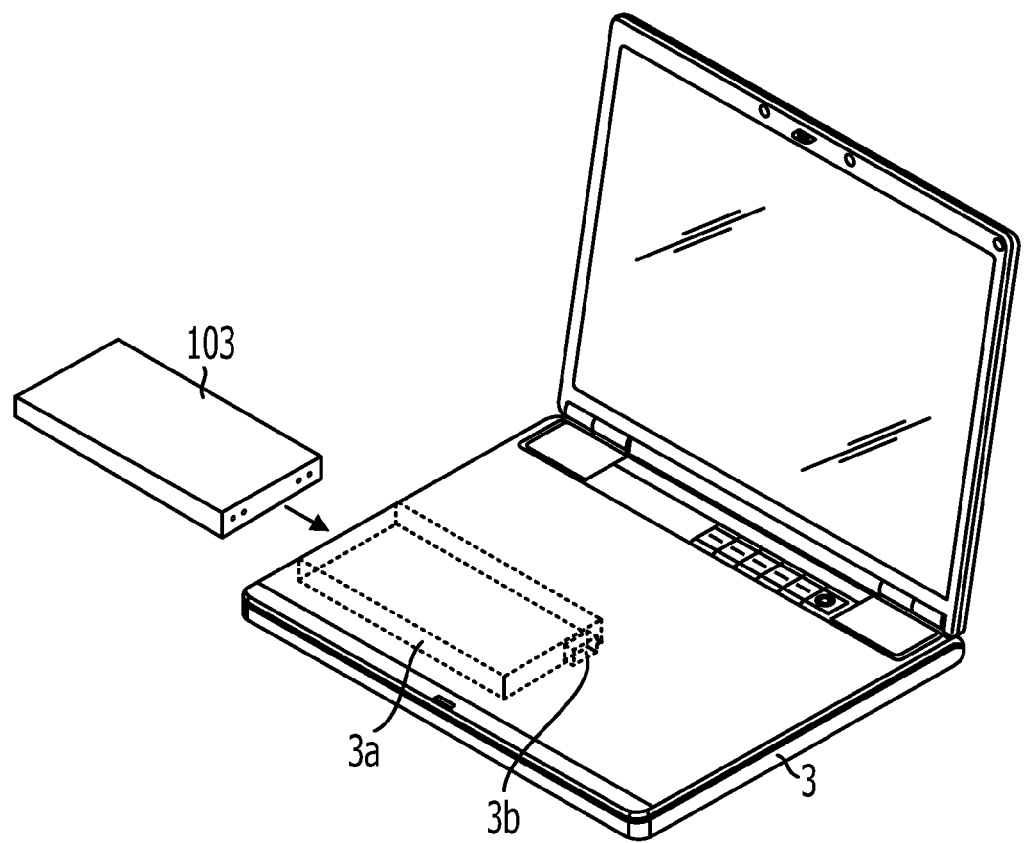
FIG. 6 is a diagram illustrating an example of the system according to the embodiment.
Figure 7A:
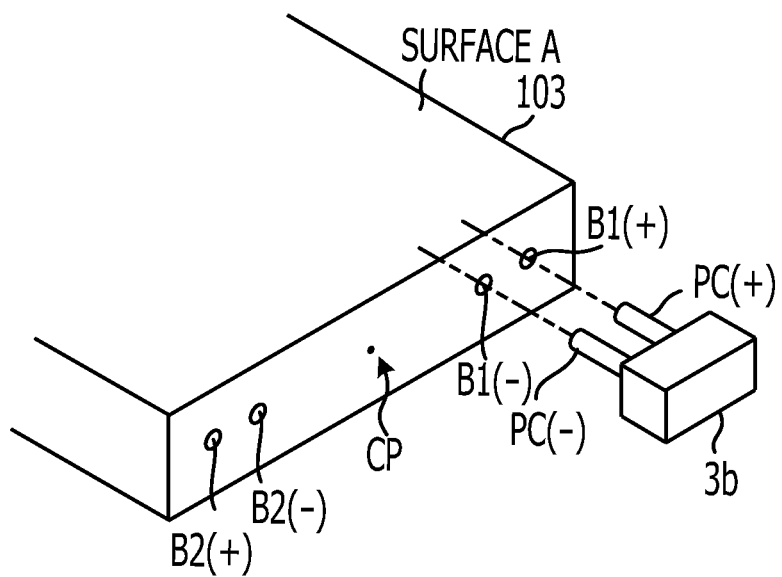
FIGS. 7A and 7B are diagrams each illustrating the state of a connection of the battery pack to connectors of the PC, according to the embodiment.
Figure 7B:
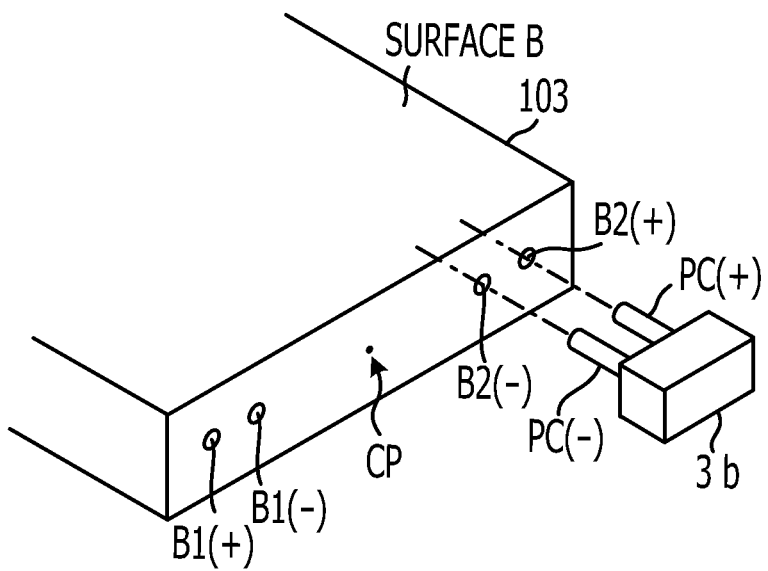
Figure 8:
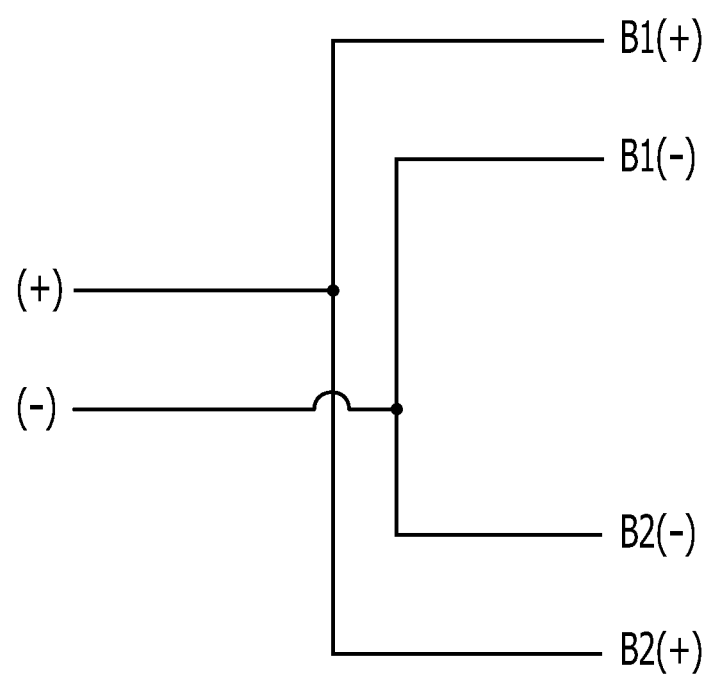
FIG. 8 is a diagram illustrating the state of an internal connection of an example of the battery pack according to the embodiment.

In an example illustrated in FIGS. 6 to 8, a battery pack 103 may be attached to a given part 3a of a PC3 from a side surface of the chassis of the PC3 and may feed power to the PC3. The PC3 has a connector 3b on the given part 3a. In this example, the connector 3b of the PC3 has a positive terminal PC(+) and a negative terminal PC(−) as illustrated in FIGS. 7A and 7B. As illustrated in FIGS. 7A and 7B, two surfaces (of the battery pack 103) that may face the bottom surface of the PC3 when the battery pack 103 is attached to the PC3 are called surface A and surface B. When the battery pack 103 is attached to the PC3 and surface A faces upward, the positive and negative terminals PC(+) and PC(−), which are both male terminals in the example illustrated in FIGS. 7A and 7B, of the PC3 fit the positive and negative terminals B1(+) and B1(−), which are female terminals in the example illustrated in FIGS. 7A and 7B, of the battery pack 103. The positive terminal PC(+) of the PC3 is electrically connected to the positive terminal B1(+) of the battery pack 103 due to the fit, while the negative terminal PC(−) of the PC3 is electrically connected to the negative terminal B1(−) of the battery pack 103 due to the fit. On the other hand, when the battery pack 103 is attached to the PC3 and the surface B faces upward, the positive and negative terminals PC(+) and PC(−) of the PC3 fit the positive and negative terminals B2(+) and B2(−), which are female terminals in the example illustrated in FIGS. 7A and 7B, of the battery pack 103. The positive terminal PC(+) of the PC3 is electrically connected to the positive terminal B2(+) of the battery pack 103 due to the fit, while the negative terminal PC(−) of the PC3 is electrically connected to the negative terminal B2(−) of the battery pack 103 due to the fit. The positive and negative terminals B1(+) and B1(−) are located point-symmetrically about the center CP of a surface (on which the terminals B1(+), B1(−), B2(+) and B2(−) are arranged) with respect to the positive and negative terminals B2(+) and B2(−) in the battery pack 103. Thus, when the battery pack 103 is attached to the PC3 and either surface A or surface B faces upward, the battery pack 103 may feed power to the PC3. FIG. 8 illustrates the state of an internal connection of the battery pack 103. As illustrated in FIG. 8, the negative terminals B1(+) and B1(−) and the positive and negative terminals B2(+) and B2(−) are electrically arranged in the battery pack 103 so that when the positive and negative terminals B1(+) and B1(−) or the positive and negative terminals B2(+) and B2(−) fit the positive and negative terminals PC(+) and PC(−) of the PC3, the battery pack 103 may feed power to the PC3.

Figure 9:
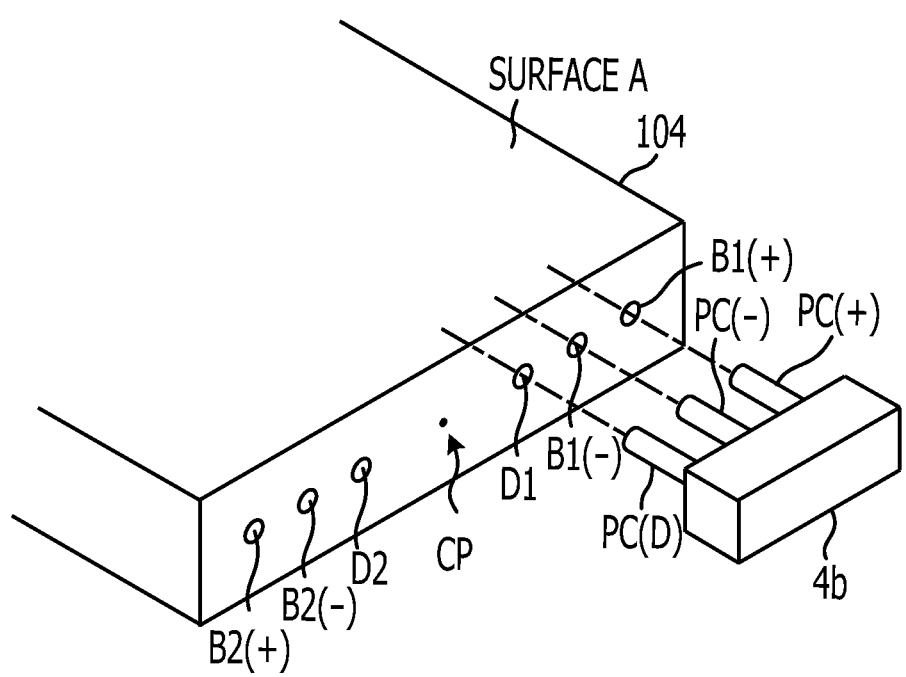
FIG. 9 is a diagram illustrating the state of a connection of the battery pack to connectors of the PC, according to the embodiment.
Figure 10:
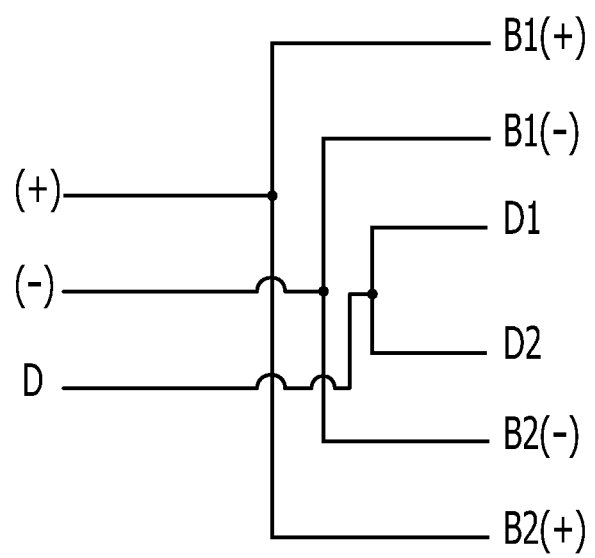
FIG. 10 is a diagram illustrating the state of an internal connection of an example of the battery pack according to the embodiment.

A battery pack 104 illustrated in FIGS. 9 and 10 is an example of a so-called smart battery. The smart battery has a terminal for transmitting and receiving data in order to communicate with a PC. For example, as illustrated in FIG. 9, a connector 4b of the PC has a positive terminal PC(+), a negative terminal PC(−) and a data terminal PC(D). In this case, the battery pack 104 may have terminals in a similar manner to the battery pack 103 illustrated in FIGS. 6 to 8. For example, as illustrated in FIG. 9, when the battery pack 104 is attached to the PC and a surface A of the battery pack 104 faces upward, the positive terminal PC(+), the negative terminal PC(−) and the data terminal PC(D) that are included in the PC (and are male terminals in the example illustrated in FIG. 9) fit a positive terminal B1(+), a negative terminal B1(−) and a data terminal D1, respectively, which are included in the battery pack 104 (and are female terminals in the example illustrated in FIG. 9). The battery pack 104 includes a positive terminal B2(+), a negative terminal B2(−) and a data terminal D2 that are located point-symmetrically about the center CP of a surface (on which the terminals B1(+), B1(−), D1, B2(+), B2(−) and D2 are arranged) of the battery pack 104 with respect to the positive terminal B1(+), the negative terminal B1(−) and the data terminal D1. When the battery pack 104 is attached to the PC and either surface A or surface B (not illustrated in FIG. 9) of the battery pack 104 faces upward, the battery pack 104 may feed power to the PC and communicate with the PC. FIG. 10 illustrates the state of an internal connection of the battery pack 104. As illustrated in FIG. 10, the terminals B1(+), B1(−), D1, B2(+), B2(−) and D2 are electrically arranged in the battery pack 104 so that when the terminals B1(+), B1(−) and D1 or the terminals B2(+), B2(−) and D2 fit the terminals PC(+), PC(−) and PC(D) of the PC, the battery pack 104 may feed power to the PC and communicate with the PC.

Figure 11A:
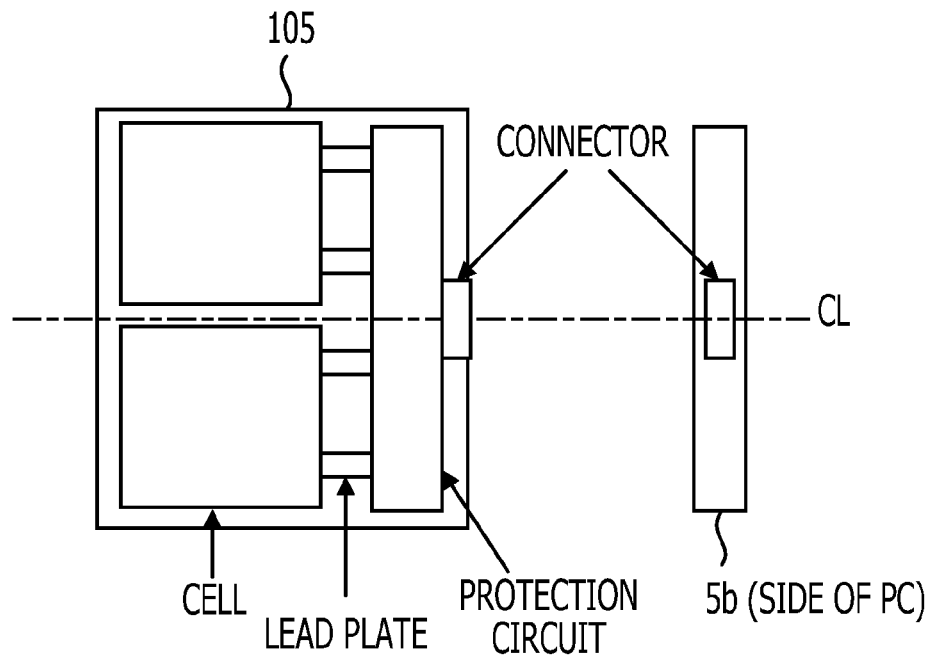
FIGS. 11A and 11B are diagrams each illustrating an example of the battery pack and connectors of the PC, according to the embodiment.
Figure 11B:
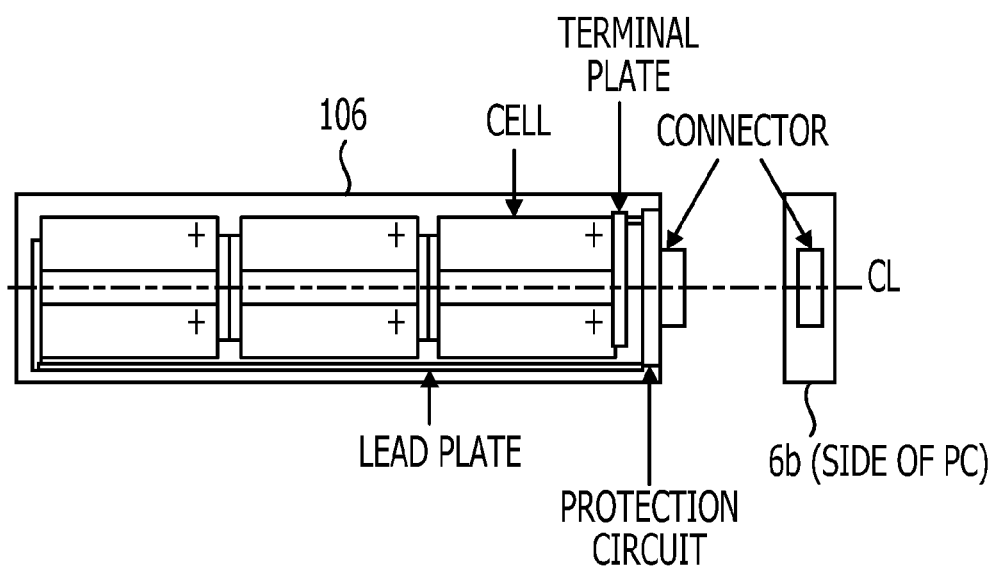

A battery pack 105 illustrated in FIG. 11A is an example of a cuboid 2-parallel/1-series battery pack, and a battery pack 106 illustrated in FIG. 11B is an example of a cylindrical 2-parallel/3-series battery pack. In each of the examples illustrated in FIGS. 11A and 11B, a plurality of cells is arranged symmetrically about a central axis CL of the battery pack. A connector of each of the battery packs 105 and 106 is located on the central axis CL of each respective battery pack. In each of the examples illustrated in FIGS. 11A and 11B, two terminal groups are included in the battery pack and arranged point-symmetrically about the center CP of a surface of the battery pack in a similar manner to the example illustrated in FIGS. 7A and 7B. Any of the two terminal groups of the battery pack 105 may fit a connector 5b of a PC. Any of the two terminal groups of the battery pack 106 may fit a connector 6b of a PC.

(3) Configuration of PC

Figure 12:
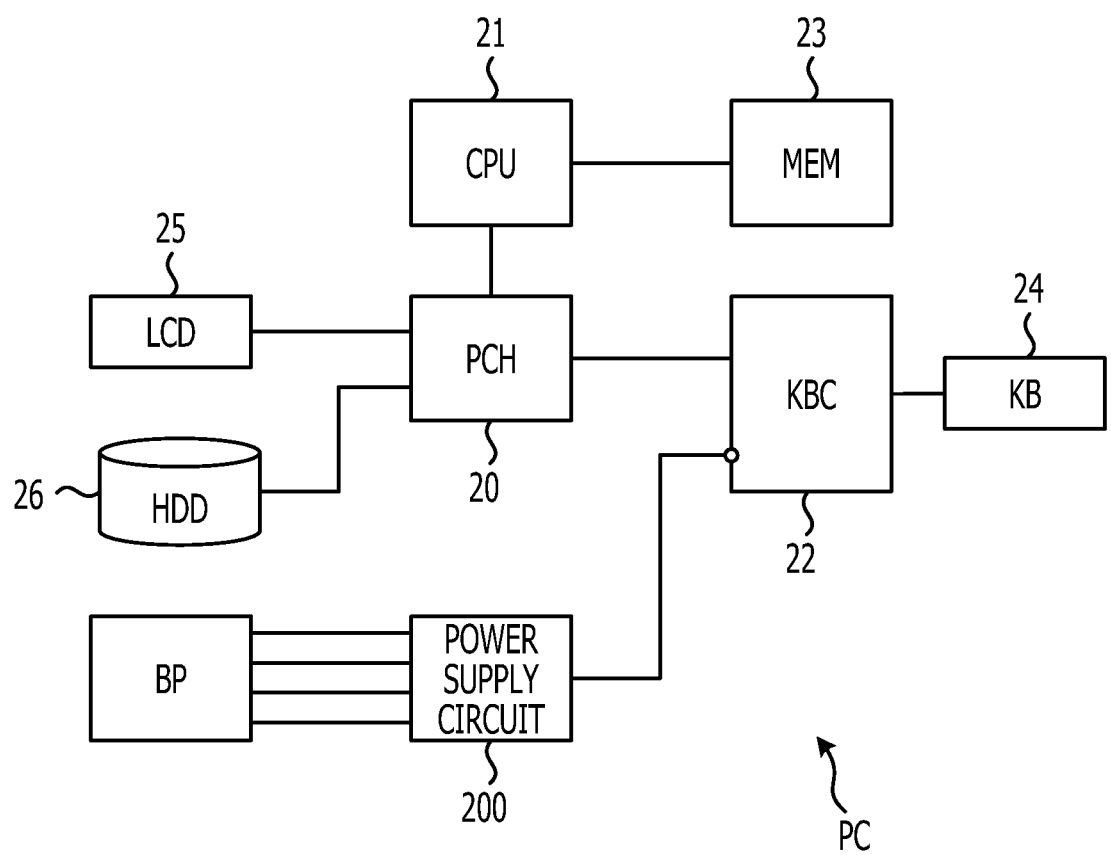
FIG. 12 is a block diagram illustrating a configuration of the PC according to the embodiment.

The configuration of a PC according to the embodiment is described with reference to FIG. 12. FIG. 12 is a block diagram illustrating the configuration of the PC according to the embodiment.

As illustrated in FIG. 12, the PC includes a platform controller hub (PCH) 20, a central processing unit (CPU) 21, a keyboard controller (KBC) 22, a memory (MEM) 23, a keyboard (KB) 24, a liquid crystal display (LCD) 25, a hard disk drive (HDD) 26 and a power supply circuit 200. FIG. 12 illustrates the state in which a battery pack (BP) is connected to the power supply circuit 200 of the PC.

The CPU 21 is an example of a first calculator, an example of a second calculator and an example of an instructing unit.

The PCH 20 is a part of a chipset of the PC and also called a southbridge. The PCH 20 is connected to the input/output devices (keyboard controller 22, LCD 25 and HDD 26 illustrated in FIG. 12) and includes a control circuit that controls the input/output devices.

The memory 23 includes a random access memory (RAM) and a read only memory (ROM). The RAM is a main memory of the CPU 21. The ROM is nonvolatile memory that stores a program that is executed by the CPU 21. Various programs, including an operating system (OS), are stored in the memory 23. The CPU 21 has a memory controller therein. The CPU 21 reads and executes the various programs including the OS and performs various calculations.

The keyboard controller 22 is connected to the PCH 20 and the keyboard 24 and has a function of a keyboard interface. The keyboard controller 22 has a microcontroller. The keyboard controller 22 detects an attachment state (first attachment state or second attachment state) of the battery pack and informs the OS of the detected attachment state, as described later.

The power supply circuit 200 generates power supply voltage for the parts of the PC and supplies the generated power supply voltage to the parts of the PC. The power supply circuit 200 may limit supply of power based on the state (for example, a sleep mode) of the PC.

The LCD 25 includes a liquid crystal display (LCD) monitor and a driving circuit, for example. The LCD monitor has thin film transistors arranged in a matrix form on a pixel basis. The driving circuit drives the thin film transistors. The LCD 25 displays image data transmitted from the CPU 21 on the LCD monitor.

The HDD 26 is a nonvolatile storage device that has a relatively large capacity.

(4) Method for Determining State of Attachment of Battery Pack to PC

Next, an example of a method for determining the state of attachment of the battery pack to the PC is described. The example of the determination method is described with reference to FIG. 13. In the example of the determination method, the battery pack 102 illustrated in FIGS. 5A and 5B is used. In the example illustrated in FIG. 13, the power supply circuit 200 includes the positive terminal PC1(+), the negative terminal PC1(−), the positive terminal PC2(+) and the negative terminal PC2(−). The battery pack 102 has the positive and negative terminals B1(+) and B1(−) arranged on surface A and has the positive and negative terminals B2(+) and B2(−) arranged on surface B. When the battery pack 102 is attached to the PC so that surface A of the battery pack 102 faces upward, the battery pack 102 is in the first attachment state in which the positive terminal B1(+) is connected to the positive terminal PC1(+), the negative terminal B1(−) is connected to the negative terminal PC1(−), and the terminals B2(+), B2(−), PC2(+) and PC2(−) are open. On the other hand, when the battery pack 102 is attached to the PC so that surface B of the battery pack 102 faces upward, the battery pack 102 is in the second attachment state in which the positive terminal B2(+) is connected to the positive terminal PC2(+), the negative terminal B2(−) is connected to the negative terminal PC2(−), and the terminals B1(+), B1(−), PC1(+) and PC1(−) are open.

Figure 13:
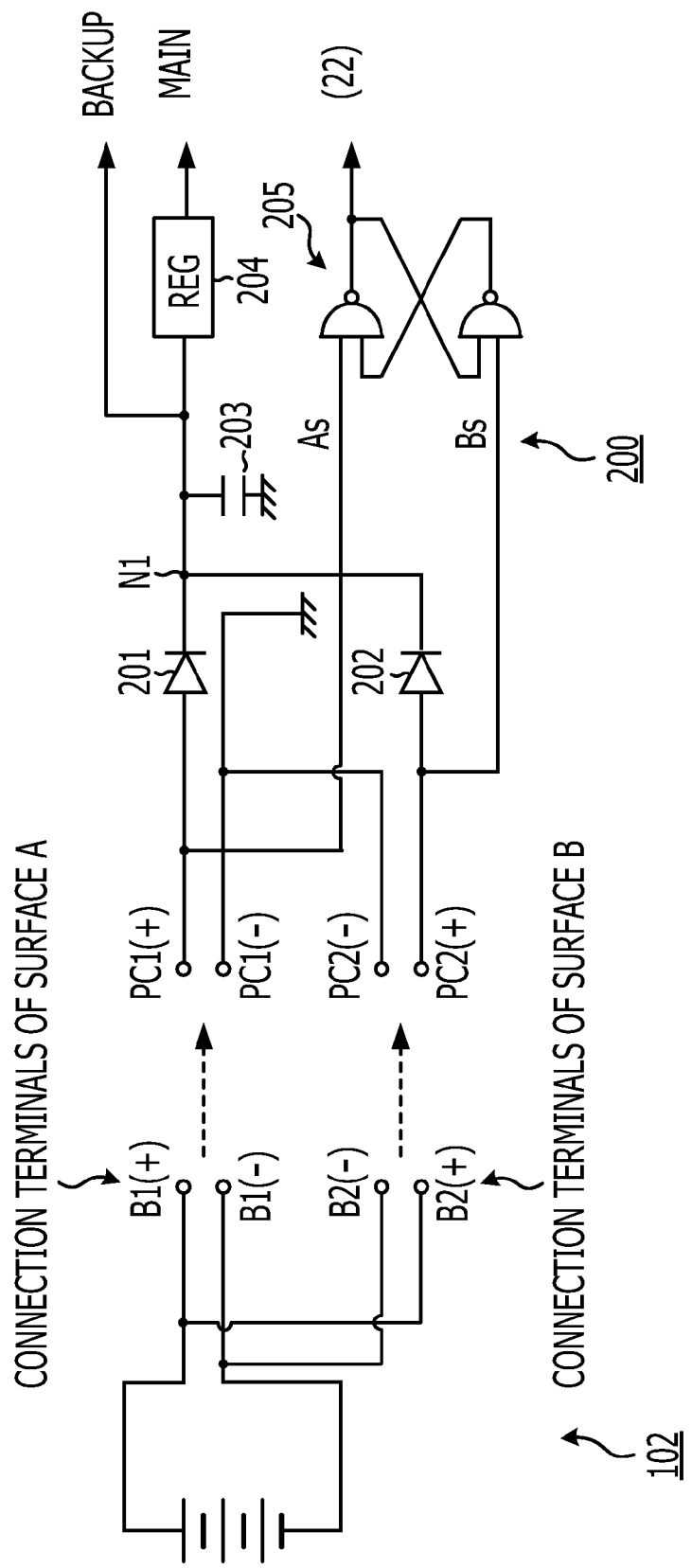
FIG. 13 is a diagram explaining a method for determining a state of attachment of the battery pack to the PC, according to the embodiment.

FIG. 13 illustrates an example of the power supply circuit 200.

In the example illustrated in FIG. 13, the negative terminals PC1(−) and PC2(−) are connected to a ground potential. The positive terminal PC1(+) is connected to a regulator (REG) 204 through a diode 201 and a common node N1, while the positive terminal PC2(+) is connected to the regulator 204 through a diode 202 and the common node N1. A capacitor 203 is arranged between the node N1 and the regulator 204 in order to maintain a voltage applied to the node N1. In the example illustrated in FIG. 13, two types of power, main power (main) and backup power (backup), are generated by the power supply circuit 200.

Voltages As and Bs of the positive terminals PC1(+) and PC2(+) are input to a NAND latch circuit 205. The NAND latch circuit 205 outputs a signal to the keyboard controller 22. The keyboard controller 22 detects a voltage of the signal output from the NAND latch circuit 205 and thereby determines (detects) which of either the terminal PC1(+) or terminal PC2(+) is connected to the battery pack 102. Specifically, the keyboard controller 22 determines (detects) whether the state of attachment of the battery pack 102 to the PC is the first attachment state (in which the surface A faces upward) or the second attachment state (in which the surface B faces upward).

(5) Functions of PC's OS According to Embodiment

Figure 14:
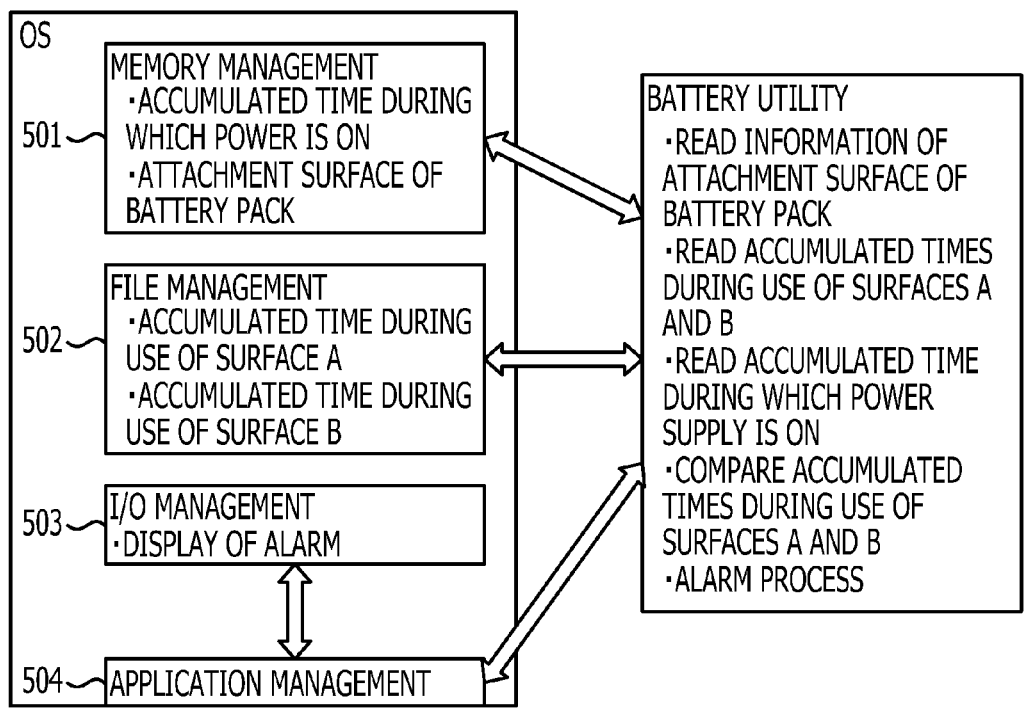
FIG. 14 is a functional block diagram illustrating functions of an OS and a keyboard controller of the PC, according to the embodiment.
Figure 15:
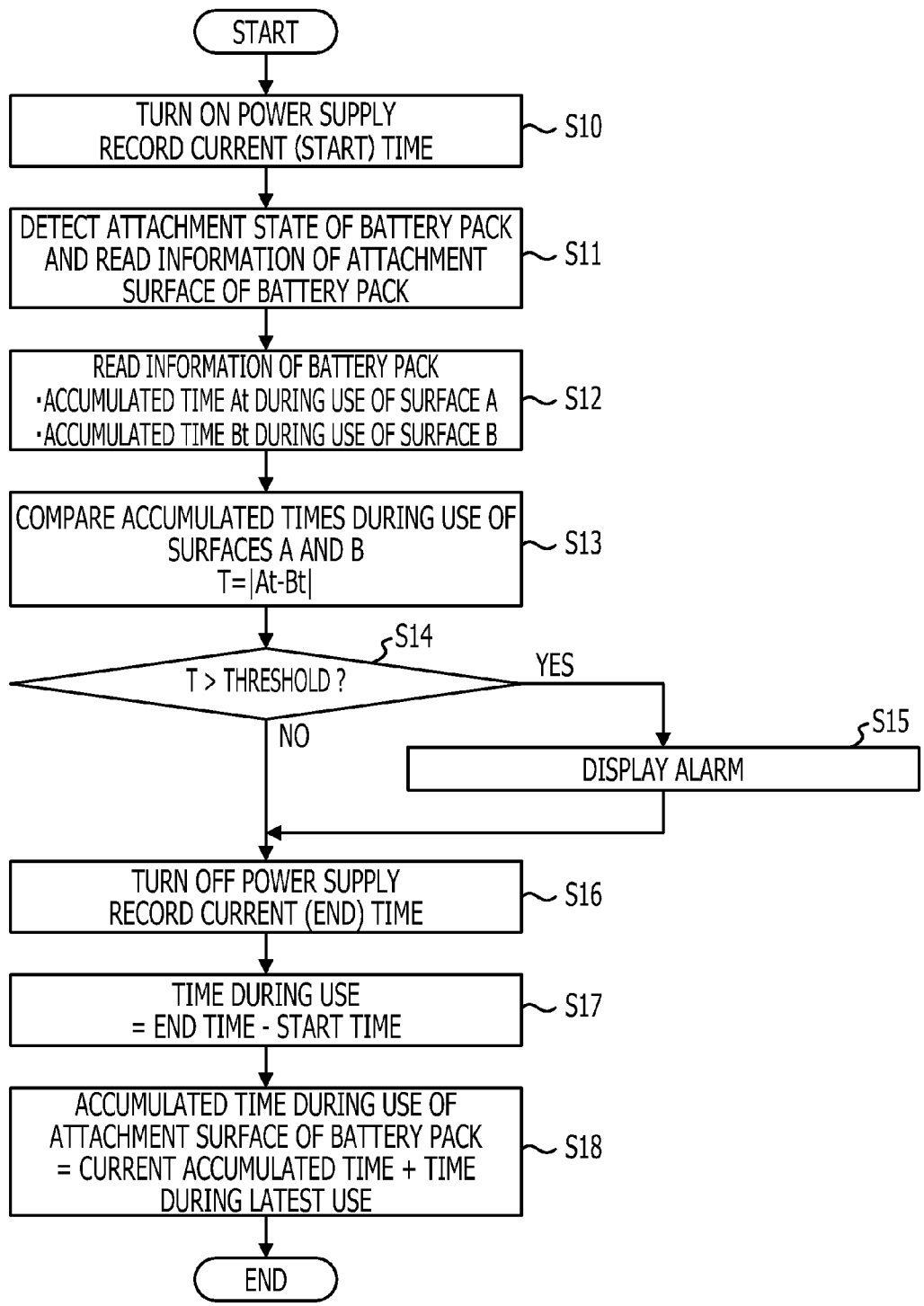
FIG. 15 is a flowchart of a process to be executed by an application program stored in the PC, according to the embodiment.

Next, functions of the PC's OS according to the embodiment are described with reference to FIGS. 14 and 15. FIG. 14 is a functional block diagram illustrating the functions of the OS of the PC according to the embodiment and functions of an application program (a battery utility described later). FIG. 15 is a flowchart of operations to be performed by the PC according to the embodiment.

As described with reference to FIG. 13, in the PC according to the embodiment, the keyboard controller 22 determines whether the attachment state of the battery pack is the first attachment state (in which surface A faces upward) or the second attachment state (in which surface B faces upward). Then, the keyboard controller 22 informs the OS of the result of the determination. For example, when power is supplied to the PC so that the PC starts, and the OS of the PC is activated, the keyboard controller 22 informs the OS of the result of the determination.

As illustrated in FIG. 14, the OS includes a memory management functional block 501, a file management functional block 502, an input/output (I/O) management functional block 503 and an application management functional block 504 as functional blocks to be executed by the OS. The PC has, installed therein, a battery utility as application software that is executed on the OS. FIG. 15 is a flowchart of operations that are performed by the OS cooperating with the battery utility.

In the following description, the use of the battery pack that is in the first attachment state or attached to the PC so that the surface A faces upward may be represented by "the use of surface A", while the use of the battery pack that is in the second attachment state or attached to the PC so that the surface B faces upward may be represented by "the use of surface B".

The memory management functional block 501 has a function to record accumulated time during which the power supply of the PC is on.

The memory management functional block 501 has a function to chronologically record the attachment surface information (that is, which of surface A or B faces upward when the battery pack is attached to the PC) of the battery pack. Specifically, a functional block of the battery utility acquires, from the keyboard controller 22, information about how the battery pack 102 is attached to the PC, and records attachment surface information for the battery pack 102 based on the acquired information.

The file management functional block 502 has a function to sequentially record and update the accumulated time for the use of surface A and the accumulated time for the use of surface B based on the attachment surface information of the battery pack 102, which is chronologically recorded by the memory management functional block 501. The accumulated time for the use of surface A is an example of a first accumulated time, while the accumulated time for the use of surface B is an example of a second accumulated time.

The I/O management functional block 503 is a functional block for performing I/O management for display of an alarm.

The application management functional block 504 is a functional block for managing the application (a battery utility in this example).

The battery utility includes various types of functional blocks. For example, the battery utility has a function of reading the attachment surface information of the battery pack from the memory management functional block 501 of the OS. The battery utility has a function of reading the accumulated time for the use of surface A and the accumulated time for the use of surface B from the file management functional block 502 of the OS. The battery utility has a function of reading, from the memory management functional block 501 of the OS, the accumulated time during which the power supply is on. The battery utility has a function of comparing the accumulated time for the use of surface A with the accumulated time for the use of surface B. The battery utility has a function of performing an alarm process that instructs the user to change the attachment state of the battery pack based on the comparison of the accumulated time for the use of surface A with the accumulated time for the use of surface B.

Figure 16:
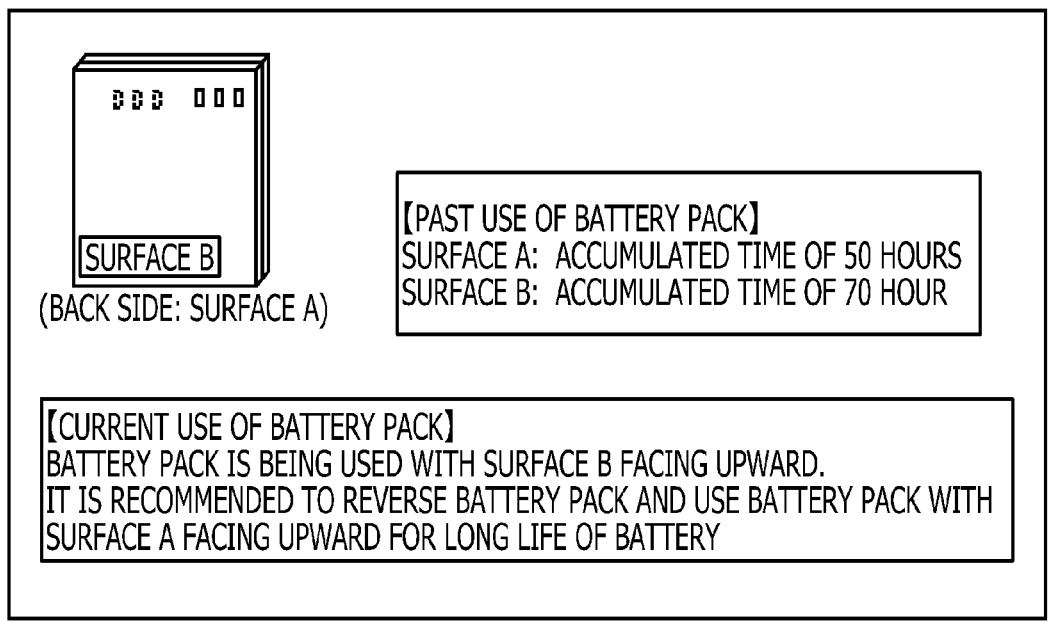
FIG. 16 is a diagram illustrating an example of an alarm displayed on the PC, according to the embodiment.

Referring to FIG. 15, procedures to be executed by the battery utility are described as follows. When the PC's power supply is turned on, the battery utility records the current time (that is, the start time) (step S10). Then, when the keyboard controller 22 detects the attachment state of the battery pack, the keyboard controller 22 informs the OS of the detected attachment state. The battery utility reads the attachment surface information for the battery pack from the OS (step S11). Then, the battery utility reads an accumulated time (At) for the use of surface A and an accumulated time (Bt) for the use of surface B (step S12), and compares the accumulated times, that is, calculates the difference T ($=|At-Bt|$) between the accumulated times (At) and (Bt) (step S13). When the difference T is larger than a given threshold (determined in step S14), the difference T means that either surface A or B is excessively used, compared to the other surface. Thus, an alarm is displayed that instructs the user to change the attachment state of the battery pack (step S15). FIG. 16 illustrates an example of the alarm displayed on the PC when the accumulated time for the use of surface A is greater than the accumulated time for the use of surface B by a value that is greater than the threshold.

When the difference T is less than or equal to the given threshold in step S14, the battery utility does not cause the alarm to be displayed.

When the PC's power supply is turned off, the battery utility records the current time (that is, the end time) (step S16). Then, the battery utility calculates the difference between the start time recorded in step S10 and the end time recorded in step S16 as a time for the use of the attachment surface (indicated by the information read in step S11) of the battery pack (step S17). The battery utility adds the time (calculated in step S17) for the use of the attachment surface (surface A or B) of the battery pack to the current accumulated time for the use of the relevant attachment surface and thereby calculates a new accumulated time (step S18).

As described above, when the difference between the accumulated time during which the battery pack is in the first attachment state (that is, during the use of surface A) and the accumulated time during which the battery pack is in the second attachment state (that is during the use of surface B) is larger than the given threshold, the PC according to the embodiment instructs the user to change the attachment state by displaying an alarm or the like so that the user may perceptually recognize the instruction. By having the user appropriately change the attachment state, the accumulated time for the use of surface A and the accumulated time for the use of surface B may become nearly equal to each other. The position of a heat source, such as the CPU, is fixed in the PC. Thus, when the state of attachment of the battery pack to the PC is changed, the position of the cells included in the battery pack relative to the heat source change. When the accumulated time for the use of surface A and the accumulated time for the use of surface B become nearly equal to each other, the amounts of heat received by the cells from the heat source may be equalized. Thus, early degradation of a specific cell included in the battery pack may be suppressed due to the equalization of the amount of received heat. A reduction in the life of the battery pack, therefore, may be suppressed.

(6) Modified Example

FIG. 13 illustrates an example of the power supply circuit 200. A modified example of the power supply circuit 200 is described below. In the example illustrated in FIG. 13, the power supply circuit 200 has the diodes 201 and 202. Thus, power may be lost due to forward voltage drop of each of the diodes 201 and 202. Power lost due to forward voltage drop does not occur in a circuit according to the modified example.

Figure 17:
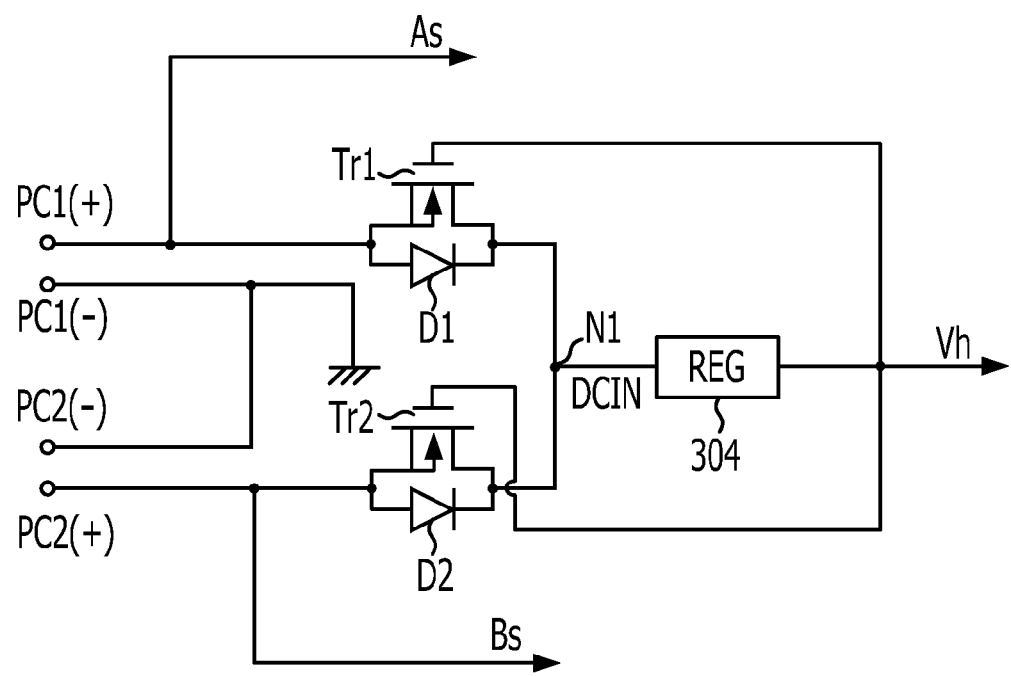
FIG. 17 is a diagram illustrating a modified example of a power supply circuit of the PC, according to the embodiment.

FIG. 17 illustrates the circuit according to the modified example. The circuit illustrated in FIG. 17 includes body diodes D1 and D2 instead of the diodes 201 and 202 illustrated in FIG. 13. The body diodes D1 and D2 are included in NMOS transistors (Tr1 and Tr2). The NMOS transistors Tr1 and Tr2 are turned on slightly after the power supply of the PC is turned on. After the NMOS transistors Tr1 and Tr2 are turned on, forward voltage drop hardly occurs in each of the body diodes D1 and D2. Thus, loss of power may be suppressed.

In the modified example illustrated in FIG. 17, the negative terminals PC1(−) and PC2(−) are connected to a ground potential, while the positive terminals PC1(+) and PC2(+) are connected to drains of the NMOS transistors Tr1 and Tr2, respectively. Sources of the NMOS transistors Tr1 and Tr2 are connected to the regulator 304 through the common node N1. A voltage output terminal of the regulator 304 is connected to the gates of the NMOS transistors Tr1 and Tr2.

The positive terminals PC1(+) and PC2(+) are examples of first and second positive terminals, respectively. The NMOS transistors Tr1 and Tr2 are examples of first and second switches, respectively. The body diodes D1 and D2 are examples of first and second diodes, respectively.

When a voltage is input to the circuit from either of the positive terminals PC1(+) and PC2(+), based on the attachment state of the battery pack, a forward voltage is input to either of the body diodes D1 and D2. In this case, the relevant body diode prevents a sneak current from flowing. Thus, the input of voltage from either of the positive terminals PC1(+) and PC2(+) does not affect the other positive terminal. When a voltage DCIN that passes through either of the diodes D1 or D2, based on the attachment state of the battery pack, is input to the regulator 304, and the regulator 304 operates, the NMOS transistors Tr1 and Tr2 are turned on by a voltage Vh (corresponding to the main power (Main) illustrated in FIG. 13) output from the regulator 304. Thus, forward voltage drop hardly occurs in the relevant body diode. In the circuit according to the modified example illustrated in FIG. 17, power is hardly lost in a normal state.

FIGS. 18A-18D are timing chart of the operations described with reference to FIG. 17.

It is assumed that the battery pack is attached to the PC so that surface A faces upward in the timing chart. In this case, when a voltage is input to the circuit from the positive terminal PC1(+), a voltage As immediately rises and through the body diode D1 the voltage DCIN rises. The rising of the voltage Vh is delayed by a time period in which the regulator 304 operates. When the voltage Vh rises, the NMOS transistors Tr1 and Tr2 are turned on and a voltage Bs of the positive terminal PC2(+) also rises. As is apparent from the timing chart illustrated in FIGS. 18A-18D, when the circuit according to the modified example illustrated in FIG. 17 is used, it is possible to determine the attachment state of the battery pack by determining whether or not the time when the voltage As of the positive terminal PC1(+) rises is earlier than the time when the voltage Bs of the positive terminal PC2(+) rises. The keyboard controller 22 acquires the value of the voltage As of the positive terminal PC1(+) and the value of the voltage Bs of the positive terminal PC2(+) and informs the OS of the acquired values. Then, after the power supply of the PC is turned on so that the PC starts, the OS determines the attachment state of the battery pack during a determination time period illustrated in FIGS. 18A-18D. In addition, the battery utility may instead determine the attachment state of the battery pack.

The embodiment is described above in detail. The electronic device, the system and the program, which are disclosed herein, are not limited to the embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An electronic apparatus in which a battery device is to be attached, the electronic apparatus comprising:
    a processor; and
    a memory coupled to the processor, wherein the processor executes a process including:
    calculating a first accumulated time during which the battery device feeds power to the electronic apparatus while being attached to the electronic apparatus in a first attachment state in which a first surface of the battery device faces a reference surface provided in the electronic apparatus;
    calculating a second accumulated time during which the battery device feeds power to the electronic apparatus while being attached to the electronic apparatus in a second attachment state in which a second surface of the battery device faces the reference surface, the second surface being different from the first surface; and providing an instruction to change an attachment state of the battery device when a difference between the first accumulated time and the second accumulated time exceeds a given time.

2. The electronic apparatus according to claim 1, further comprising:
a first positive terminal that is electrically connected to one of two positive terminals provided in the battery device when the battery device is in the first attachment state;
a second positive terminal that is electrically connected to the other of the two positive terminals provided in the battery device when the battery device is in the second attachment state;
a regulator that generates a power supply voltage;
a first switch that is connected between the first positive terminal and the regulator in parallel to a first diode and becomes a conductive state when the power supply voltage is applied to the first switch; and
a second switch that is connected between the second positive terminal and the regulator in parallel to a second diode and becomes a conductive state when the power supply voltage is applied to the second switch,
wherein the process further includes detecting the attachment state of the battery device on a basis of timings of rising in voltages of the first positive terminal and the second positive terminal.

3. An electronic apparatus in which a battery device is to be attached, the electronic apparatus comprising:
a first calculator that calculates a first accumulated time during which the battery device feeds power to the electronic apparatus while being attached to the electronic apparatus in a first attachment state in which a first surface of the battery device faces a reference surface provided in the electronic apparatus;
a second calculator that calculates a second accumulated time during which the battery device feeds power to the electronic apparatus while being attached to the electronic apparatus in a second attachment state in which a second surface of the battery device faces the reference surface, the second surface being different from the first surface; and
an instructing unit that provides an instruction to change an attachment state of the battery device when a difference between the first accumulated time and the second accumulated time exceeds a given time.

4. A system comprising:
an electronic apparatus including a processor and a memory coupled to the processor; and
a battery device that includes a chassis with a first surface and a second surface and feeds power to the electronic apparatus when the battery device is attached to the electronic apparatus in any of a first attachment state in which the first surface faces a reference surface provided in the electronic apparatus and a second attachment state in which the second surface faces the reference surface, the second surface being deferent from the first surface, and wherein the processor executes a process including:
calculating a first accumulated time during which the battery device feeds power to the electronic apparatus while being in the first attachment state;
calculating a second accumulated time during which the battery device feeds power to the electronic apparatus while being in the second attachment state; and
providing an instruction to change an attachment state of the battery device when a difference between the first accumulated time and the second accumulated time exceeds a given time.

5. The system according to claim 4,
wherein the electronic apparatus includes
a first positive terminal that is electrically connected to one of two positive terminals provided in the battery device when the battery device is in the first attachment state,
a second positive terminal that is electrically connected to the other of the two terminals provided in the battery device when the battery device is in the second attachment state,
a regulator that generates a power supply voltage,
a first switch that is connected between the first positive terminal and the regulator in parallel to a first diode and becomes a conductive state when the power supply voltage is applied to the first switch, and
a second switch that is connected between the second positive terminal and the regulator in parallel to a second diode and becomes a conductive state when the power supply voltage is applied to the second switch, and
wherein the process further includes detecting the attachment state of the battery device on a basis of timings of rising in voltages of the first positive terminal and the second positive terminal.

6. A non-transitory computer-readable recording medium having stored therein a program for causing a computer to execute a process for controlling an electronic apparatus in which a battery device is to be attached, the process comprising:
calculating a first accumulated time during which the battery device feeds power to the electronic apparatus while being attached to the electronic apparatus in a first attachment state in which a first surface of the battery device faces a reference surface provided in the electronic apparatus;
calculating a second accumulated time during which the battery device feeds power to the electronic apparatus while being attached to the electronic apparatus in a second attachment state in which a second surface of the battery device faces the reference surface, the second surface being different from the first surface; and
providing an instruction to change an attachment state of the battery device when a difference between the first accumulated time and the second accumulated time exceeds a given time.

\* \* \* \* \*